E. G. Blakslee,
Pipe Coupling.
Nº 66,782.          Patented July 16, 1867.
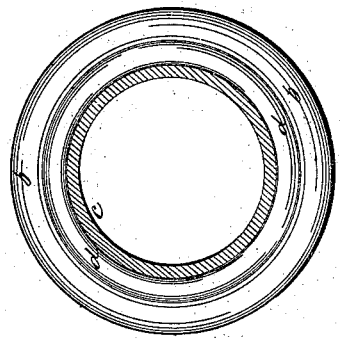
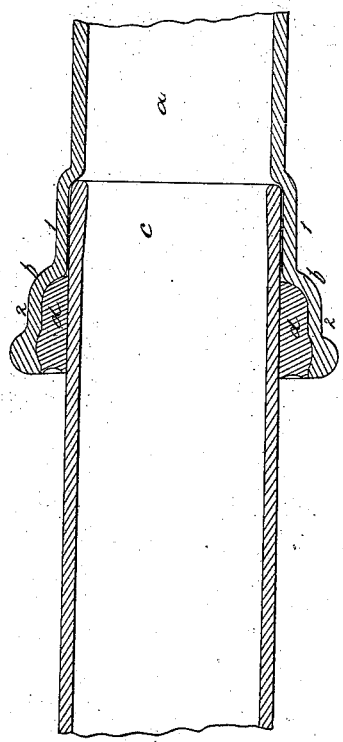
Witnesses
Chas H Smith
Geo. D. Waester
Inventor
E. G. Blakslee

United States Patent Office.

EBENEZER G. BLAKSLEE, OF SING SING, NEW YORK.

Letters Patent No. 66,782, dated July 16, 1867.

---

IMPROVEMENT IN JOINTS FOR IRON PIPES.

---

The Schedule referred to in these Letters Patent and making part of the same.

---

TO ALL WHOM IT MAY CONCERN:

Be it known that I, EBENEZER G. BLAKSLEE, of Sing Sing, in the county of Westchester, and State of New York, have invented, made, and applied to use a certain new and useful Improvement in Joints for Iron Pipes; and I do hereby declare the following to be a full, clear, and exact description of the said invention, reference being had to the annexed drawing, making part of this specification, wherein—

Figure 1 is a longitudinal section of the improved joints; and

Figure 2 is an end view of the socket.

In connecting cast-iron pipes, it is necessary that one pipe slip into the next a sufficient distance to give solidity to the joint. The tightness of that joint, however, depends upon a ring of lead cast into the sockets after the pipes have been put together. The casting of this ring of lead is difficult, because the joint has first to be packed with oakum or similar material to prevent the lead running through, and in horizontal joints it is necessary that a mould be formed by pipe-clay or similar material around the joint before the lead is poured. With the usual precautions it often happens that a jet of melted lead will run into the pipe and form an obstruction, particularly in pipes for water-closets. The amount of lead required for each joint is considerable, because it extends so far into the joint.

The nature of my said invention consists in a socket formed with two enlargments. The first or smaller enlargement is of a size to receive the end of the next length of pipe, and fitting tightly gives a sufficient length of bearing to make a reliable joint. The second enlargement of the socket receives the lead or soft metal that makes the joint tight, and this being comparatively shallow, requires less lead than the usual joint, and at the same time can be made equally tight by caulking. I employ a lead ring cast in a suitable mould and slipped over the end of the pipe and pressed into the socket when the pipes are placed together, and then caulked or driven firmly into the socket, and this makes as firm and reliable a joint as when the lead is cast directly into the socket, and the inconvenience, delay, and difficulties attendant upon the casting into the joint are avoided.

In the drawing, $a$ represents part of a length of pipe, on which is the socket $b$, having the first interior enlargement 1 1 of a size to receive the end $c$ of the next length of pipe. This end $c$ should be somewhat thickened to strengthen it. 2 2 is the second enlargement of the socket receiving the lead packing $d$. This lead packing might be cast into the socket 2 after the pipes are put together, but I prefer and use a lead band cast in a separate mould of the right size and slipped into place and caulked. A slight recess cast within the socket may be employed as shown in the drawing, the same holding the lead ring more firmly in place when caulked.

What I claim, and desire to secure by Letters Patent, is—

The joint for cast-iron pipes formed by a socket, with two enlargements at one end of a length of pipe, receiving the end of the next length of pipe, and made tight by the packing $d$, as set forth.

I also claim forming the packing for the joints of cast-iron pipes of a ring of soft metal cast in a separate mould, and caulked or driven into the joint, as set forth.

In witness whereof I have hereunto set my signature this 16th day of March, A. D. 1867.

E. G. BLAKSLEE.

Witnesses:
CHAS. H. SMITH,
GEO. D. WALKER.